United States Patent [19]
deAngelis

[11] 3,788,481
[45] Jan. 29, 1974

[54] METHOD FOR THE ELIMINATION AND POSSIBLE RECOVERY OF THE FLOATING POLLUTING SUBSTANCES, MINERAL OILS IN PARTICULAR, FROM SHEETS OF WATER AND BOAT FITTED TO THIS AIM

[76] Inventor: Andrea Lucio deAngelis, via F. 11i Coda 37/1, Genova, Italy

[22] Filed: June 10, 1971

[21] Appl. No.: 151,878

[30] Foreign Application Priority Data
June 11, 1970 Italy.................................. 25830/70

[52] U.S. Cl.......................... 210/242, 210/DIG. 21
[51] Int. Cl............................................ E02b 15/04
[58] Field of Search............... 210/83, 242, DIG. 21

[56] References Cited
UNITED STATES PATENTS

| | | | |
|---|---|---|---|
| 2,330,508 | 9/1943 | McColl | 210/DIG. 21 |
| 3,219,190 | 11/1965 | Thune | 210/242 |
| 3,517,812 | 6/1970 | Bucchioni et al. | 210/242 X |
| 3,578,171 | 5/1971 | Usher | 210/242 |
| 3,534,859 | 10/1970 | Amero et al. | 210/242 |

Primary Examiner—John Adee
Attorney, Agent, or Firm—Toren and McGeady

[57] ABSTRACT

Method for the elimination and/or the recovery of floating polluting substances from liquid surfaces a, and boat for carrying out the method according to which:

the polluted liquid surface is successively, fully or in part, withdrawn from the action of the wind and, at least in part, from the natural wave motion, and segregated;

the segregated floating polluting substance is skimmed together with a minimum quantity of the underlying water;

the liquid skimmed is collected and decanted while the floating substance is separated.

5 Claims, 5 Drawing Figures

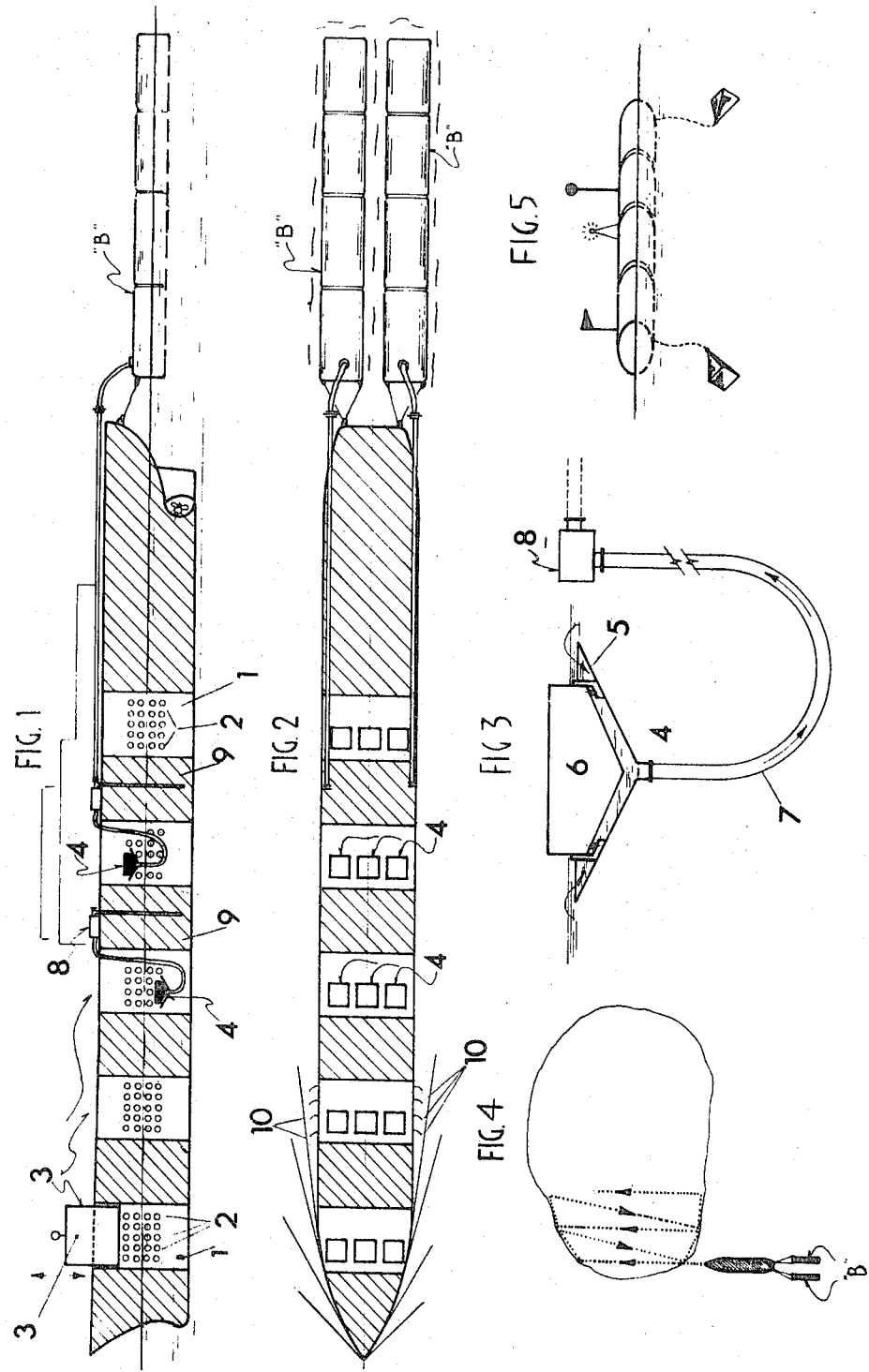

METHOD FOR THE ELIMINATION AND POSSIBLE RECOVERY OF THE FLOATING POLLUTING SUBSTANCES, MINERAL OILS IN PARTICULAR, FROM SHEETS OF WATER AND BOAT FITTED TO THIS AIM

The present invention concerns a method for the elimination and, possibly, the recovery of floating polluting substances, mineral oils in particular, from sheets of water, according to which the sheet of wate is successively withdrawn from the action of the wind and, at least partially, from the natural wave motion, and segregated.

Then the polluting substance is skimmed and the liquid so collected is decanted while the polluting substance is separated and recovered. The present invention concerns also a boat or vessel fitted to realize this method.

The problem of the elimination and, possibly, the recovery of floating polluting substances, mainly liquid hydrocarbons such as naphta and mineral oils in general, hereinafter called "oils", has been gone into in depth by technicians all over the world. Various solution have been proposed but until now none of them allows the solution of the problem against rough or, even merely, choppy seas.

We have now found that it is possible to solve this problem through a boat furnished, in addition to the usual tanks, with one or more chambers fitted to be put in connection — through openings pierced into the plating and provided with interception organs, as gate valves or the like — with the surrounding water surface on which the boat is floating.

The water with the floating oil layers enters through the openings into the chamber(s), being withdrawn from the action of the wind so that a quiet and horizontal sheet of liquid necessary to an efficacious separation of the oil is formed.

Within these chambers one or more per se known devices, formed for example by a funnel whose upper edge remains submerged at an adjustable distance from the surface of the liquid, are placed. This funnel(s) is linked at its upper end, for exemple by means of tie rods, with a float, while its lower end tapered to a pipe shape, is connected with a flexible pipe whose other end is connected to a pump.

This pump sucks the liquid from the funnel(s) and conveys it into a tank where it decants: the separated water is discharged e.g. into the sea, while the oil so recovered can be conveyed to another tank. It is of course possible to use, instead of a pump, a liquid-lift or other lifting means.

Since, as already stated, the funnel(s) is connected with a float, the device moves vertically according to the greater or minor boat draft and consequently to the load stored in it. Vertical slides are usually arranged at the sides of the funnel to facilitate the proper running of the device avoiding lateral shift. It is clear that for a more efficient operation of the device, the upper edge of the funnel should be kept, from the surface of the liquid at a distance constantly equal to the thickness of the oil layer: this requires, among other things that the liquid surface remains as still as possible and this is, in fact, substantially realized by putting in communication the surface of the water floating the boat with the chamber(s) of the same, by means of fitted interception and control organs for regulating the flow of the liquid entering the chamber(s).

In this way it is theoretically possible to collect and pump through the funnel(s) only the floating polluting substance. In practice, as already said, it is necessary to decant the liquid sucked by the pump and discharge the separated aqueous layer, e.g. into the sea.

In particular, it may be convenient to pump the liquid collected by the funnel(s), before or after the decantation, into flexible to-wable floating containers, e.g., of plastic material, well known in this field.

These containers which may be rolled up when carrying them on the boat and unrolled before usage, provide economical transportation means. This invention is now further illustrated through a non-restrictive example by the enclosed drawings where:

FIG. 1 is a longitudinal section of a boat supplied with chambers and tanks, towing two floating plastic containers.

FIG. 2 is a plane view of the boat;

FIG. 3 is a view of the funnel-like device positioned in the chamber(s).

FIG. 4 is a schematic plan view of the outline of a polluted sea surface and the route followed by the boat to effect the elimi-nation of the polluting substance;

FIG. 5 is a view of a floating plastic container supplied with signaling and anchoring means.

In FIG. 1 the chambers 1 are supplied with openings 2 pierced in the quickwork of the boat. These openings may be opened or shut by a guillotine like member 3 or the like. The chambers are equipped with funnel devices 4, also shown enlarged in FIG. 3.

These devices are formed by a funnel 5, a float 6 from which the funnel is suspended at an adjustable distance, and by a flexible pipe 7.

The upper end of the flexible pipe 7 is connected with a pump 8. From the pump 8 two deliveries are branched off, on conveying the liquid into the floating vessels B and the other into the tanks 9. The sucking end of the pump 8 is connected with the bottom of the funnel 5 and also — even if not represented — with the bottom of the tank 9.

In FIG. 1 the funnel-device 4 is represented, for the sake of simplicity, in two chambers only, in its highest and lowest positions; it is to be understood that each chamber may be supplied with one or more funnel devices.

Though not shown, each funnel is preferably guided in its upward and downward motion by rails preventing side movements.

The elimination of the floating oil, considering the boat empty, starts upon lifting of the guillotine 3 with the funnel in its lowest position. The pumps 8 sucks the liquid and conveys it in the tanks 9 or in the vessels B.

In the first case, when the filling of the tanks is over, the liquid is left at rest, in order to separate it into two layers, the lower aqueous one is discharged off and the oily one recovered, for example, by conveying it into the vessels B.

As can be seen in FIG. 2, the boat is equipped with retractable or unlockable flaps 10, to facilitate the flow of the oily stratus into the chambers. In the figure, the flaps 10 are shown in correspondance with one chamber only, but it is understood that also the other chambers may be furnished with them.

The boat may also be equipped with arms carrying nozzles for the spraying of the polluted surface with suitable chemicals and with tanks for storing these chemicals. This equipment may in case be used in support of that just described, e.g., during rough sea or in other particular occurrences.

It is clear that many variations — all comprised within the scope of the present invention — may be brought to the described embodiment by the man skilled in the art.

I claim:

1. Boat for removing a floating liquid polluting substance from the surface of a body of liquid, such as from an open body of water exposed to the wind and natural wave motion, comprising a hull forming at least one enclosed chamber protected from the wind and natural wave motion, said hull having vertically spaced openings formed therein communicating between the body of liquid and said chamber, means for closing the openings into said chamber, a skimming means located within said chamber for skimming the liquid polluting substance from the surface of the liquid contained therein and for conveying it from the chamber, said skimming means comprises a float located within said chamber for following the level of the surface of the liquid contained therein, a downwardly converging funnel supported from said float so that its upper end is adjustably positionable closely below the surface of the liquid in said chamber, a flexible pipe connected to the lower end of said funnel, and means for withdrawing the floating liquid polluting substance from the surface of the liquid in said chamber through said flexible pipe.

2. Boat, as set forth in claim 1, wherein at least one separate tank is formed witin said hull for receiving the polluted substance after it is withdrawn from said chamber.

3. Boat, as set forth in claim 1, wherein flaps are formed on the exterior of said hull adjacent the openings therein for directing the surface layer from the body of liquid into the openings in said hull.

4. Boat, as set forth in claim 1, wherein guide rails are mounted within said chamber for guiding the upward and downward movement of said float and for preventing sideward movements thereof.

5. Boat, as set forth in claim 1, wherein collapsible storable plastic containers are attachable to said hull and floatable in the body of liquid for storing and transporting the polluted substance.

* * * * *